United States Patent [19]

Austen-Brown et al.

[11] 4,160,610
[45] Jul. 10, 1979

[54] COUPLING DEVICE FOR FURNITURE PARTS

[75] Inventors: P. Austen-Brown, Barnet; D. Youde, Aintree; R. F. Pond, Chingford, all of England

[73] Assignee: Unerman Greenman Berger Limited, London, England

[21] Appl. No.: 887,113

[22] Filed: Mar. 16, 1978

[30] Foreign Application Priority Data

Mar. 16, 1977 [GB] United Kingdom ............ 34099/77
Aug. 15, 1977 [GB] United Kingdom ............ 34099/77

[51] Int. Cl.² .................... B25G 3/00; F16D 1/00; F16B 5/00
[52] U.S. Cl. .................................. 403/407; 403/231; 403/343; 52/285
[58] Field of Search ............. 403/407, 231, 321, 343, 403/374; 52/582, 584, 285; 297/440

[56] References Cited

U.S. PATENT DOCUMENTS

| | | | |
|---|---|---|---|
| 2,581,816 | 1/1952 | Schleuter | 403/407 X |
| 2,714,751 | 8/1955 | Stuart et al. | 403/321 X |
| 3,281,169 | 10/1966 | Houvener | 52/584 |
| 3,347,574 | 10/1967 | Strubin | 403/407 |
| 3,460,860 | 8/1969 | Stevens | 52/582 |
| 3,565,469 | 2/1971 | Zwart | 52/582 |
| 3,661,410 | 5/1972 | Larson et al. | 52/582 X |
| 4,060,949 | 12/1972 | Busse | 403/231 X |

Primary Examiner—Wayne L. Shedd
Attorney, Agent, or Firm—Emory L. Groff, Jr.

[57] ABSTRACT

A knock-down fitting for connecting two sections of an article of furniture, the fitting having two cylindrical parts of similar shape for reception in corresponding bores formed in a face surface of each section, one part having a plate member with an inwardly facing rim forming a camming surface and which, on rotation of the plate is caused to project from, or be withdrawn into, the side of the one part, the other part having a recess in which the plate part may move for the rim to engage a portion thereof whereby the two parts are connected together on rotation of the plate member.

11 Claims, 13 Drawing Figures

U.S. Patent  Jul. 10, 1979  4,160,610
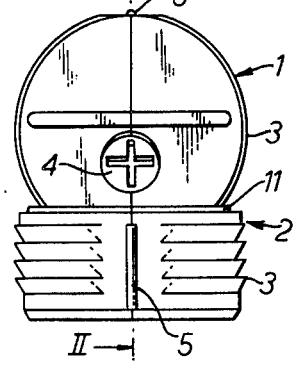
FIG. 1
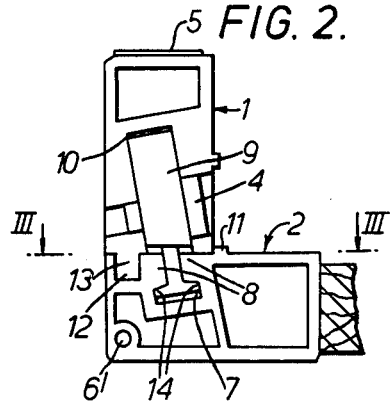
FIG. 2
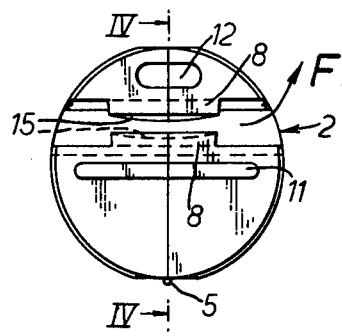
FIG. 3
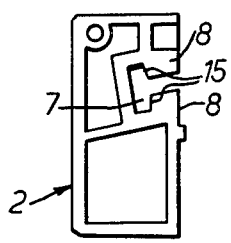
FIG. 4
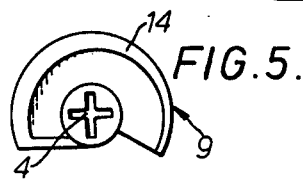
FIG. 5
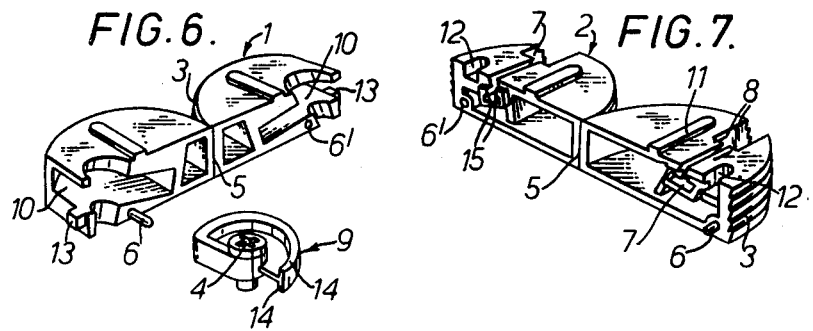
FIG. 6
FIG. 7

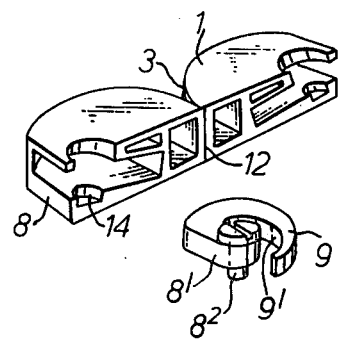
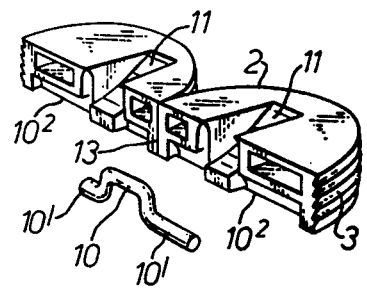
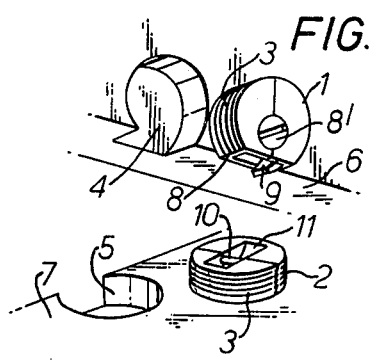
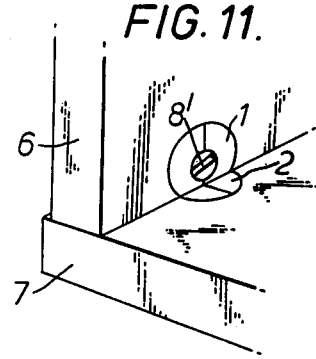
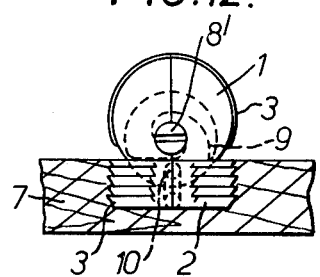
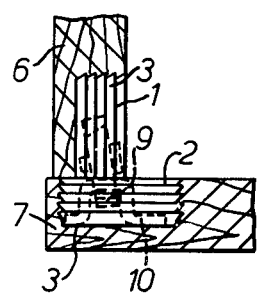

COUPLING DEVICE FOR FURNITURE PARTS

BACKGROUND OF THE INVENTION

This invention relates to a coupling device having two parts and which is primarily intended for connecting two sections of an article of furniture, especially the connection of two panels in abutment and at right-angles to one another, the parts being securable to respective sections and being engageable when brought together so that the sections are securely held together.

Coupling devices of this kind, often referred to as "knock-down" fittings, are known and their principal use is for connecting two chipboard panels forming the side walls of cupboards or the like structures. Fittings are known in which the two parts have cooperating members, one of which includes an inclined or camming surface arranged to engage a part of the other member such that rotation of the first member produces a force on the second member whereby in use the two panels to which each member is respectfully connected are drawn together.

In one such coupling device (British Pat. No. 1447387) the two parts comprise a peg-like member adapted to be driven into a bore in the end of one panel and a cylindrical member for fitment into an aperture in the second panel. The peg member has a lug arranged to engage a recess in the other part and rotation of a screw causes an inclined camming surface to engage the lug whereby the first part is secured and drawn into the second part. A disadvantage of this device is that the peg is received in an end of the panel and if this comprises chipboard secure fixture therein is difficult. A further disadvantage is that the two coupling parts require different apertures and techniques for fitment into respective panels.

In another coupling device one part comprises a peg to be fixed into the edge of one panel with the head portion projecting, and a circular plate member received in a recess in a second panel towards an edge thereof with a transverse bore through from the edge into the recess. The plate member has a slot around its periphery which opens into an inwardly-facing involute curved surface. In use the peg of the one panel is passed through the aperture in the other panel and the head thereof engaged with the slot, whereupon rotation of the plate member causes the head to locate behind the involute surface and a camming action is thereby produced. In this device the plate member is loosely located in the recess and the aforementioned disadvantages apply also.

It is the primary object of this invention to provide an improved coupling device having two parts each of which may be received in similarly dimension apertures formed in the face of two respective panels and in which when said parts are assembled to the panels there are no significantly projecting pegs or the like, whereby the panels can be stacked for storage or transport with the parts fitted.

Further objects and advantages which accrue from specific and preferred embodiments according to the invention are that on locking the two parts together an expanding force is generated within one or both parts so that firm fixing within the apertures in the panels is ensured. Another object is to provide a coupling with no loose fittings such as screws or the like which require insertion before the coupling parts can be mated.

SUMMARY OF THE INVENTION

According to this invention there is provided a coupling device having first and second parts adapted to be received and retained in apertures formed in respective furniture sections to be joined, the first part having a rotatable plate-like member which may be caused to project from a side surface of the part on rotation of the member, the plate having a rim defining, by an inward face thereof, an inwardly developing camming surface along its length, the second part having a recess defining a channel into which the plate member of the first part may move on rotation, rotation of said member causing the camming surface to engage a surface associated with the recess of the second part to pull the two parts together.

According to one preferred embodiment of this invention there is provided a coupling device having first and second parts adapted to be received and retained in apertures of respective sections to be joined, the first part having a rotatable plate member which may be caused to project from a side surface of the part on rotation of the member, the plate having an upstanding rim with the inward face thereof developing inwardly along its length to form a camming surface, the second part having a recess with an inwardly radiused surface at the mouth defining a channel into which the plate member of the first part may move, rotation of said member causing the camming surface to bear against the radiused surface to pull the two parts together.

According to a second preferred embodiment of this invention, there is provided a coupling device having first and second parts adapted to be received and retained in apertures of respective sections to be joined, the first part having a rotatable member with an involute finger which may be caused to project from a side surface of the part on rotation of the member, the inner face of the finger developing inwardly along its length to form a camming surface; the second part having a recess in a face surface and a rod extending across the recess under which the finger of the first part may locate, rotation of the member causing the camming surface to bear against the underside of the rod to pull the two parts together.

The first and second parts will be normally circular in plan, the side of the first part having a flat surface through which the finger or the plate may project. Each part may be divided diametrically whereby the member on rotation causes the first part to expand laterally along the division and the pulling force on the rod acts to cause the second part to expand laterally along its division.

BRIEF DESCRIPTION OF THE DRAWINGS

Two embodiments according to the invention will now be described in the following with reference to the accompanying drawings illustrating the said embodiments by way of example. In the drawings:

FIG. 1 is a front elevation of the coupling parts joined together,

FIG. 2 is a cross-section along the line II—II in FIG. 1 of the coupling,

FIG. 3 is a plan view of the coupling part looking in the direction III—III of FIG. 2, FIG. 4 is a section along IV—IV of FIG. 3, FIG. 5 is a plan view of the plate member, FIG. 6 is an opened-up view of the coupling part carrying the plate member, FIG. 7 is an opened-up view of the other coupling part, FIG. 8 shows an opened-up view of the coupling part of a second embodiment, FIG. 9 shows an opened-up view of the other coupling part of the second embodiment, FIG. 10 shows an exploded view of the two coupling parts and furniture panels to be connected, FIG. 11 shows the two panels when in connection, FIG. 12 shows a front elevation, and FIG. 13 shows a side view partially in section of the assembled panels and coupling parts.

DESCRIPTION OF THE PREFERRED EMBODIMENTS

Referring firstly to FIGS. 1 to 7 each part 1 or 2 is circular in plan with peripheral ridges 3 affording engagement with the surface of bores provided in the panels to be joined (of FIGS. 10 to 13). The edge surface of the part 1 is flat save for a projecting lug 13 which locates in a recess 12 on the corresponding part 2: said part 1 being further positioned by a raised lateral supporting wall 11. Each separate part 1 and 2 is moulded from a plastics material and flexibly hinged at 5 the locus of diametric division, and may be positioned when closed by a locating peg and socket 6 and $6^1$ respectively. The plate member 9 as further illustrated in FIG. 5 is provided with inwardly facing involute camming surfaces as defined by upstanding rims 14. Said plate member 9 is located within a recess 10 in part 1 so constructed as to set the axis of said plate member at an angle of approximately 10° to the plane of the surface of said part 1, and the inner surface to the rims 14 develop inwardly along the lengths to form a camming surface. Upon rotation of the plate member 9 by appropriate means e.g. a screw head 4, provided at the centre of the member 1, the plate 9 projects through the flat edge of member 1 and passes between the radiused inner facing surfaces 15 of channel 7, the radially inner surfacs of rims 14 bearing against the surfaces 15 of projections 8, the surfaces being concentric with the rotational axis of plate 9.

As the camming surface progresses further into the channel 7 the two members are effectively pulled together to form a secure combination.

The coupling device is reusable and is especially suited for securing two chipboard panels mutually at right angles.

FIGS. 8 to 13 show a second embodiment of coupling device and also the method of securing two panels mutually at right angles using same. It will be understood that the way in which the coupling device is attached to the respective panels is the same for the first embodiment already described.

Referring firstly to FIGS. 10 to 13, each part 1 or 2 is circular in plan with peripheral ridges 3 affording engagement with the inner surface of bores 4 and 5 provided in each of the panels 6 and 7. The bores are formed by identical cutting tools. The edge surface of the part 1 is flat at 8 and allows an involutely curved finger 9 to project therethrough to enable it to pass beneath a rod 10 provided in a recess 11 of the other part 2. The finger projects from a member $8^1$ rotatable in the part 1. FIG. 11 shows the panels after coupling of the two parts and rotation of member $8^1$ which pulls the parts together.

The construction of the parts and further features are described in conjunction with FIGS. 8 and 9.

The member $8^1$ has its axis of rotation inclined at an angle of about 10° to the centre axis of the part 1 to enable the blade of a screwdriver to be engaged and the inner surface $9^1$ of the finger develops inwardly along its length to form a camming surface. This surface plane is parallel to the axis of part 1 at the point where it engages the rod 10.

The part 2 carries the rod 10 which is bent as shown so that the ends $10^1$ may lie in recesses $10^2$ each side of the recess 11.

Each part 1 and 2 is moulded from a plastics material and is divided diametrically but hingedly joined at an edge 12 and 13. The part 1 has a bore 14 to receive a spigot $8^2$ of the member $8^1$. The bore and spigot both have flats whereby rotation of the member $8^1$ causes the two halves of the part 1 to be pushed outward to securely engage the bore 4. The part 2, on the other hand, has tapered surfaces defining, on each side, the recesses $10^2$ and when the rod 10 is pulled upward by the applied force of the finger 9 it causes the two halves to be forced apart. Upward movement of the rod 10 is limited to about 1mm.

In a modification the member $8^1$ is arranged to move two further metal parts, such as plates, laterally outward to assist in securing of the part 1 into a bore.

This coupling device is reusable and is especially useful for securing chipboard panels.

In both the described embodiments the apertures or recesses may be cut into the panels using the same cutting equipment and the respective parts inserted therein, again using similar automatic insertion equipment.

We claim:

1. An improved device for securing together at right angles two panels of an article of furniture, the device having first and second parts adapted to be received and retained in apertures formed in respective furniture sections to be joined, one part having a rotatable member with a camming surface which engages a part of the other member to secure the two parts together, the improvement being characterised by each part being of cylindrical form with a number of peripheral projections which serve to retain the part within a circular bore provided in the face of a respective panel, the first part having a flat side which locates against the face of the second part with the axes of said first and second parts at right angles, the first part having a rotatable plate which may be turned and caused to project from the flat side, the plate having a rim defining by an inward face thereof, an inwardly developing camming surface along its length, the second part having a recess in the face defining a channel into which the plate member of the first part may move, with the camming surface engaging a surface in the channel so that the face of the second part is pulled into firm contact with the flat side of the first part.

2. A coupling device according to claim 1, wherein the plate is flat with an upstanding peripheral rim with the inward face of the rim developing inwardly along its length towards the axis to form a camming surface, the second part having a curved channel with an inwardly radiused surface and into which the plate member of the first part may move with the camming surface bearing against the radiused surface to pull the two parts together.

3. A coupling device according to claim 2, wherein the plate has an upstanding rim on each side thereof, the inside facing surface of each rim forming an involute camming surface, the channel in the other part having two opposed projections with the surfaces of the projections which lie within the recess being curved to conform with and engage one with each inside facing surface of each rim.

4. A coupling device according to claim 1, wherein the plate has a cut out part to form therein an involute finger which may be caused to project from the flat side of the part on rotation, the inward face of the finger developing inwardly along its length to form a camming surface; the second part having a recess in the face surface with a rod extending across the recess and under which the finger of the first part may locate, rotation of the member causing the camming surface to bear against the underside of the rod to pull the two parts together.

5. A coupling device according to claim 4, wherein the rod is of U-shape with the free ends extending laterally to engage spaced cavities in the body of the second part which is diametrically divided, the cavities having angled rod receiving surfaces whereby a force applied to rod causes the part to expand along the division.

6. A coupling device according to claim 1, wherein the peripheral projections comprise a plurality of annular shoulders around each part with each shoulder having a surface angled away from the direction of insertion of the part into the bore.

7. A coupling device according to claim 1, wherein the plate has axial bosses received in bores of the first part, the first part being divided diametrically and hinged to open to receive the plate.

8. A coupling device according to claim 1, wherein the second part is divided diametrically and arranged to expand along the diameter when the plate member of the first part engages same and the parts are drawn together.

9. A coupling device according to claim 1, wherein cooperating projections and recesses are provided on the flat side of the first part and face of the second part to achieve alignment when said parts are brought together for coupling.

10. A coupling device according to claim 1, wherein each part includes a medial division with a hinge connection at one edge, each part being a one piece moulding of a plastics material with the hinge connection integral therewith.

11. A coupling device according to claim 10, wherein each part is symmetrical about the medial division.

* * * * *